United States Patent
Liu et al.

(10) Patent No.: US 11,631,424 B1
(45) Date of Patent: Apr. 18, 2023

(54) DUAL READER CONTROLLER

(71) Applicant: Seagate Technology LLC, Fremont, CA (US)

(72) Inventors: Xiong Liu, Singapore (SG); Quan Li, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/686,064

(22) Filed: Mar. 3, 2022

(51) Int. Cl.
  *G11B 5/008* (2006.01)
  *G11B 27/36* (2006.01)
  *G11B 5/012* (2006.01)

(52) U.S. Cl.
  CPC .................. *G11B 5/012* (2013.01)

(58) Field of Classification Search
  CPC ......... G11B 5/012; G11B 19/20; G11B 27/36; G11B 5/40; G11B 5/03; G11B 5/00817; G11B 5/5508; G11B 5/00
  USPC .................. 360/75, 60, 61, 31, 71
  See application file for complete search history.

(56) References Cited

U.S. PATENT DOCUMENTS

| | | | |
|---|---|---|---|
| 9,658,784 B1* | 5/2017 | Ahmad | G06F 3/0653 |
| 10,910,002 B1* | 2/2021 | Cai | G11B 5/5508 |
| 2008/0062549 A1 | 3/2008 | Duan et al. | |
| 2015/0062755 A1 | 3/2015 | Sapozhnikov et al. | |
| 2016/0148645 A1 | 5/2016 | Zhu et al. | |
| 2017/0200468 A1 | 7/2017 | Zhu et al. | |
| 2020/0234728 A1 | 7/2020 | Wu | |

* cited by examiner

*Primary Examiner* — Nabil Z Hindi
(74) *Attorney, Agent, or Firm* — Holzer Patel Drennan

(57) ABSTRACT

The technology disclosed herein provides a method including determining an acceptable parameter rate for a dual reader storage device having dual readers, identifying one of the dual readers as the preferable reader, comparing an actual parameter rate of the storage device to the acceptable parameter rate of the storage device, and in response to determining that the actual parameter rate is below the acceptable parameter rate, operating the storage device using only the preferable reader. In one implementation, the parameter rate is bit-error rate (BER) of the dual readers.

20 Claims, 4 Drawing Sheets

DUAL READER CONTROLLER

BACKGROUND

Electronic data storage devices provide access (storage and retrieval) to data under the control of electrical signaling. Many different recording mediums exist for storing the data, each having different characteristics and parameters. Memories used in data storage devices can be classified into volatile memories and non-volatile memories. Non-volatile memories, e.g., those using magnetic recording media or floating-gate transistors, maintain stored data in the absence of electrical power. Volatile memory, such as Dynamic-Random-Access-Memory (DRAM) or Static-Random-Access-Memory (SRAM), will lose stored data when electrical power is removed. The amount of power consumed by various storage devices is an important factor in consideration of the total cost of operation (TCO) of various storage devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

The technology disclosed herein provides a method including determining an acceptable parameter rate for a dual reader storage device having dual readers, identifying one of the dual readers as the preferable reader, comparing an actual parameter rate of the storage device to the acceptable parameter rate of the storage device, and in response to determining that the actual parameter rate is below the acceptable parameter rate, operating the storage device using only the preferable reader. In one implementation, the parameter rate is bit-error rate (BER) of the read operation.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

The technology disclosed herein pertains to minimizing HDD power consumption in multi-sensor magnetic recording (MSMR) storage device. This disclosure proposes to use the single reader of dual readers for the normal read operations when the bit-error rate (BER) is below a threshold and using the dual readers only when BER is above the predetermined threshold. In one implementation, both of the readers are calibrated and the single reader is selected to be the one with better or preferable certification. The proposed method can reduce the power consumption by up to 0.3 W.

Specifically, an implementation of the technology disclosed herein provides a method including determining an acceptable parameter rate for a dual reader storage device having dual readers, identifying one of the dual readers as the preferable reader, comparing an actual parameter rate of the storage device to the acceptable parameter rate of the storage device, and in response to determining that the actual parameter rate is below the acceptable parameter rate, operating the storage device using only the preferable reader. In one implementation, the parameter rate is bit-error rate (BER) of the read operation.

Figure 1:
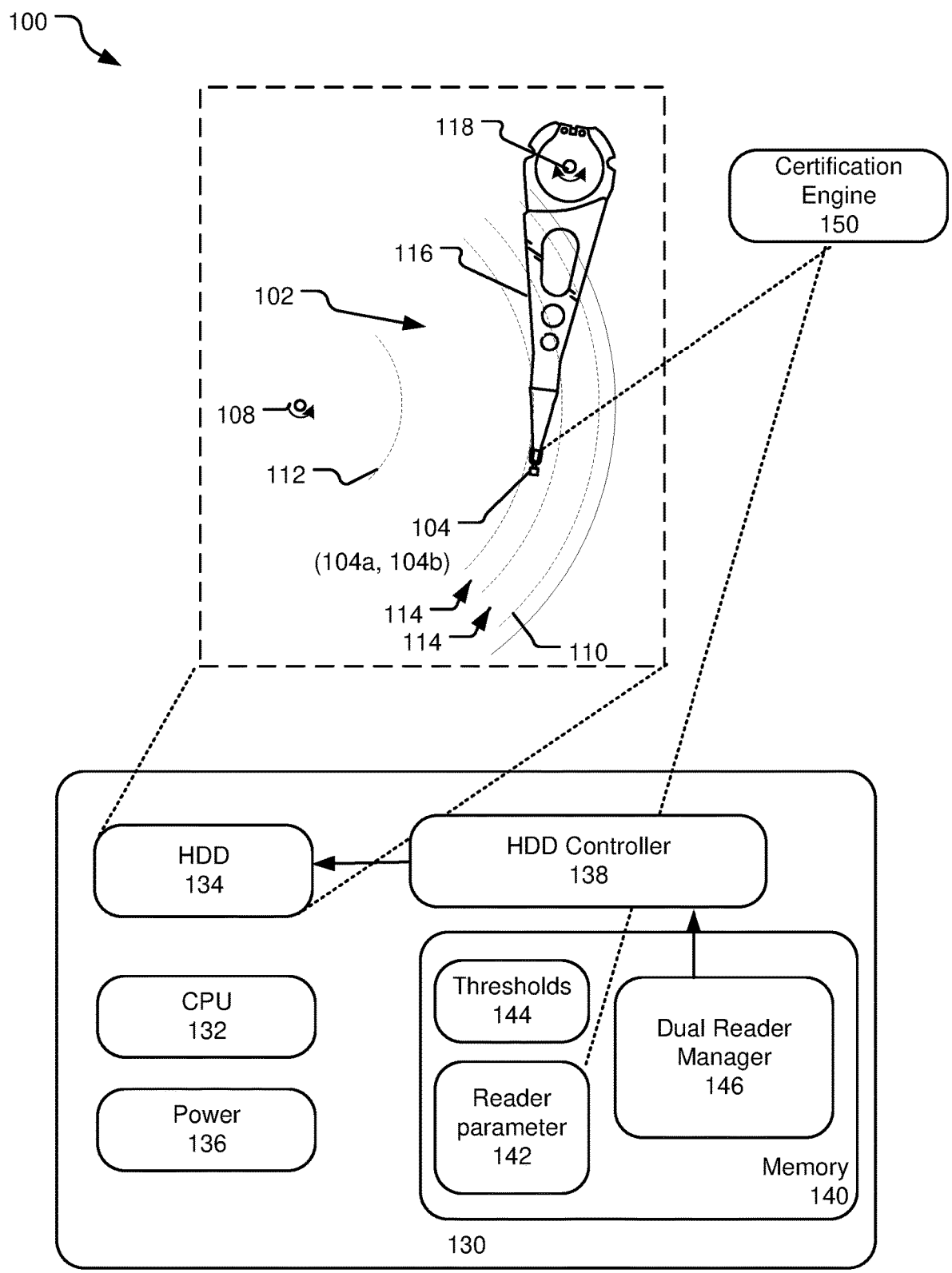
FIG. 1 illustrates a schematic diagram of an example HDD dual reader controller system disclosed herein.

FIG. 1 illustrates a schematic diagram of an HDD dual reader controller system 100 disclosed herein. Specifically, the dual reader controller system 100 may be implemented on a computer 130 including a CPU 132, an HDD 134, and a power source 136. The computer 130 may also include a memory 140, such as a read-only memory (ROM) or random access memory (RAM) that is used to implement one or more functionalities of the dual reader controller system 100.

In the illustrated implementation, the HDD 134 is further illustrated to have a dual readers 104 that are implemented on arm 116. The HDD 134 may store data on media 102 that is configured on a number of concentric tracks 114 between an inner diameter (ID) 112 and an outer diameter (OD) 110. The HDD may be configured to spin around an axis 108 whereas the arm 116 may be configured to rotate around a spindle 118 so that the dual reader 104 is able to access various tracks between the ID and the OD. The dual reader 104 may be a selectable dual reader having a first reader and a second reader and it may be configured so that the data may be read from the tracks using the first reader, the second reader, or using both the first and the second reader simultaneously.

In one implementation, the HDD 134 may be certified at the manufacturing stage to determine various operating parameters. For example, during the certification, the HDD 134 may be operated a number of times to determine various parameters to determine the stress test conditions. As illustrated, a certification engine 150 may certify various operating parameters of the HDD 134, including parameters of the dual reader 104. Such operating parameters may include, for example, bit error rate (BER) of each of the dual readers, magnetoresistive (MR) offset, which is the distance between reader and writer in cross track direction, read-bias voltage, fly-height, write current, write overshoot and duration, tracker per inch (TPI), bits per inch (BPI), etc. The MR offset may be a function of track radius and can be provided for one of reader one vs. writer, reader two vs. writer, and dual readers vs. writer.

With respect to data stored on the media 102 for relatively large periods of time, thermal decay of the media 102 may eventually result in data loss of an undesirable magnitude. Thermal decay is a progressive loss of amplitude of recorded data on the media 102 and it causes a loss of playback signal-to-noise ratio (SNR), which in turn causes degraded bit error rate (BER) of the recovered data. The BER of each reader may be defined as a ratio of error bits to total bits. Thus, the BER may represent thermal decay of the disc media 102. During the certification of the HDD 134, the certification engine 150 may read predetermined tracks with known data using each of the dual readers 104 a number of times to determine the number of bit errors per unit time or per given number of read attempts.

Thus, the bit error rate for each of the dual readers 104 may be given by number of bit errors divided by the total number of transferred bits during a studied time interval. In the illustrated implementation, the BER may be defined as log 10 (bit error rate). Thus, if the bit error rate over the predetermined time-period is 1% (0.01), the BER is −2.00. Thus, the less the error, smaller the BER.

The dual readers 104 may include a first reader 104a and a second reader 104b. The certification engine 150 may determine that for the first reader 104a, the number of received bits during the predetermined time-period that have been altered due to noise, interference, distortion, or synchronization error results in a BER for the first reader 104a to be −2.00. Similarly, the BER of the second reader 104b may be −1.90. In this case, the first reader 104a has a lower BER and therefore better or preferable performance. In this case, the first reader 104a is determined at to be the preferable reader for a single reader operation.

Furthermore, the certification engine 150 may also determine acceptable BER for read operation of the HDD 134. Such acceptable BER may depend on a number of factors of the HDD 134, including method of synchronization, type of data stored on different sectors, etc. For example, the acceptable BER may be lower for sectors where critical data, such as system data, is stored. On the other hand, the acceptable BER may be higher for sectors with non-critical data. Alternatively, the acceptable BER may be higher for sectors storing video data that may be retrieved with higher redundancy. This is given that the higher the redundancy of a sector, the HDD 134 can tolerate higher BER.

In one implementation, the acceptable BER values may include a lower acceptable BER value and an upper acceptable BER value. Here the lower acceptable BER value may be the acceptable BER during a read operation using a single reader of the dual readers 104. On the other hand, the upper acceptable BER value may be the acceptable BER during a read operation using a both readers of the dual readers 104. For example, the lower acceptable BER value may be −1.65. Therefore, when the actual BER of the HDD 134 is determined to be below −1.65, a single reader may be used to read data. Specifically, in this case, the preferable reader of the dual readers 104 is used to read data with the actual BER being below −1.65. On the other hand the upper acceptable BER value may be −1.55. Thus, when the actual BER of the HDD is above −1.55, both of the dual readers 104 are used to read the data.

The parameters of the HDD 134, as determined by the certification engine 150, may be stored in a reader parameter module 142 of the memory. Similarly, the acceptable BER values may be stored in thresholds 144 module of the memory 140. A dual reader manager 146 may store one or more programs or functions that use the thresholds 144 and the reader parameters 142 to generate control signals that are used to control the HDD 134 via an HDD controller 138. Specifically, the dual reader manager 146 receives the actual BER values for the HDD 134 and compares it to the upper acceptable BER and the lower acceptable BER to determine, whether to use one of the dual readers 104 to read the data or to use both of the dual readers 104. Furthermore, the dual reader manager 146 also uses the certified BER values of each of the dual readers 104 to determine which reader to use for reading data when the actual BER is below the lower acceptable BER value.

Figure 2:
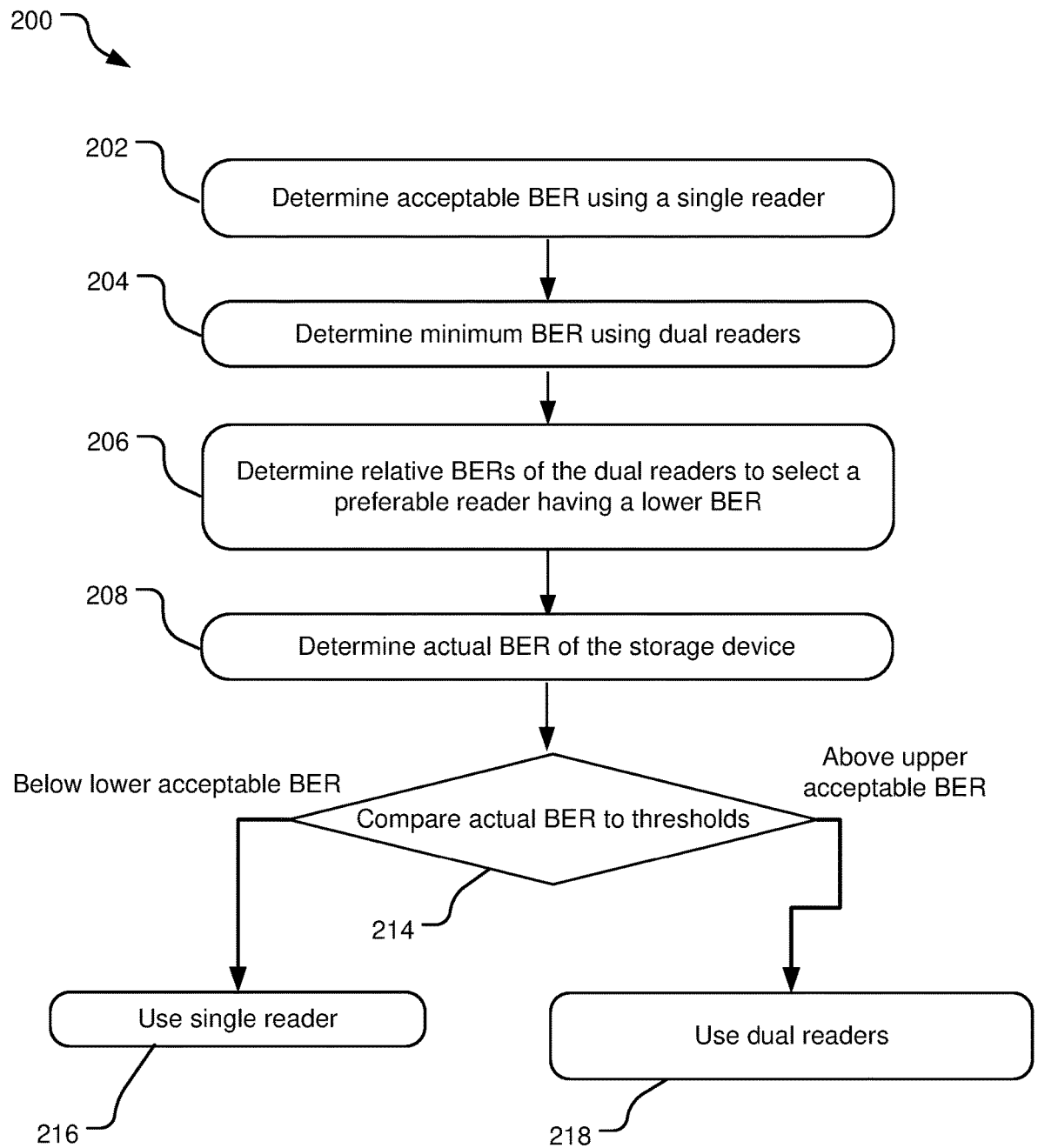
FIG. 2 illustrates example operations for managing dual readers based on certification parameters of a dual reader storage system.

FIG. 2 illustrates operations 200 for managing dual readers based on certification parameters of a dual reader storage system. An operation 202 determines acceptable BER using a single reader. In one implementation, the acceptable BER using a single reader may be the lower acceptable BER value, such as −1.65. An operation 204 determines a minimum BER when using dual readers. In one implementation, the minimum BER using dual readers may be the upper acceptable BER value, such as −1.55. An operation 206 determines relative BER of each of the dual readers to select a preferable reader as the one having a lower BER. For example, the relative BERs of each of the readers may be determined during the certification stage of an HDD. An operation 208 determines the actual current BER of the storage device for the last read operation or read operations for a preceding predetermined time-period.

An operation 214 compares the current actual BER of a read operation to the thresholds—the acceptable BER using a single reader and the minimum BER using dual readers. If the current actual BER of a read operation is below the lower acceptable BER, next read operation is conducted using a single reader at 216. Specifically, the next read operation 216 may be performed using the preferable of the dual reader as determined during the certification of the dual reader storage device. In one implementation, the acceptable BER using a single reader and the minimum BER using dual readers may be the same. If the current actual BER of a read operation is above the upper acceptable BER, next read operation is conducted using dual readers at 218.

Figure 3:
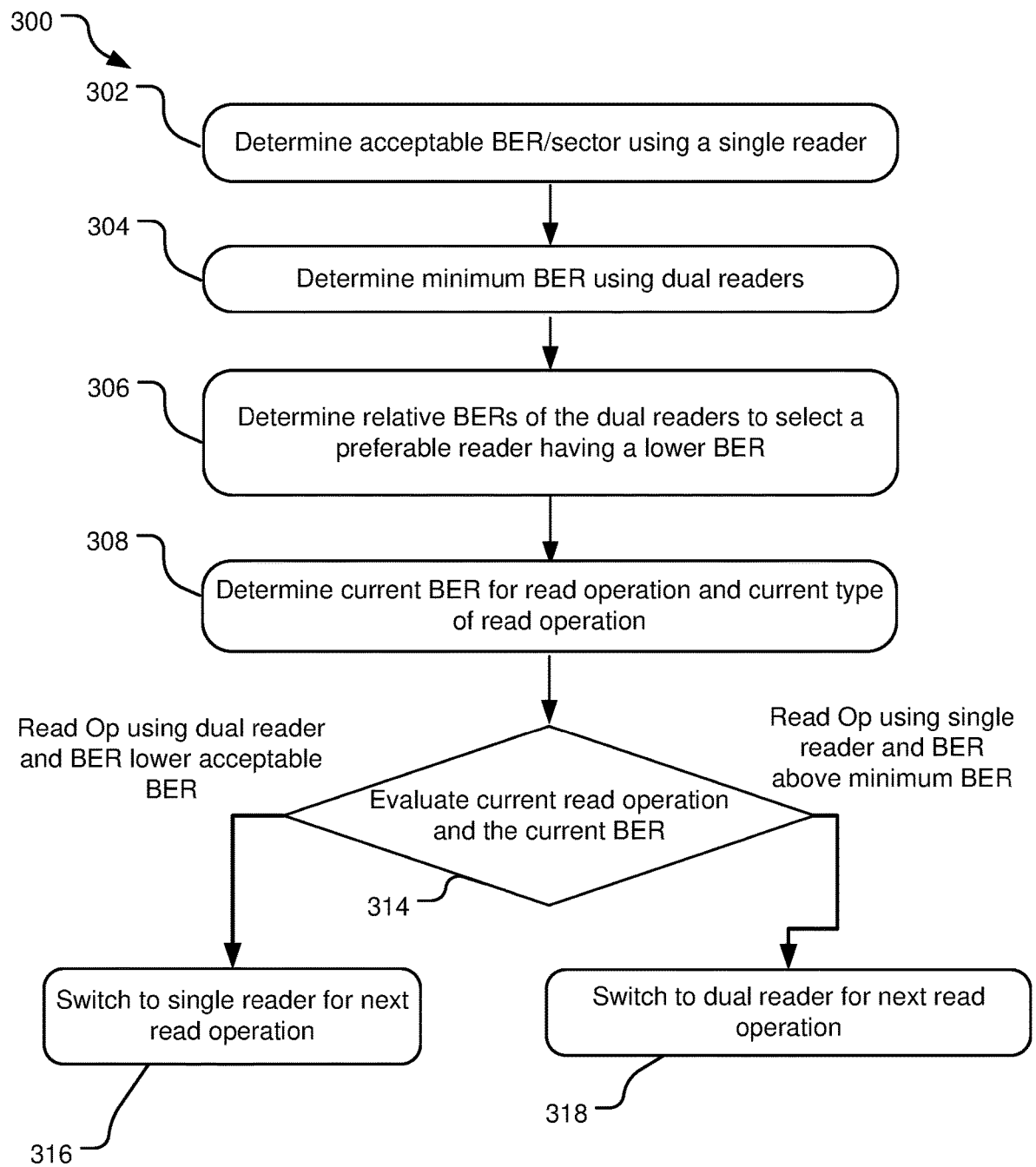
FIG. 3 illustrates alternative example operations for managing dual readers based on certification parameters of a dual reader storage system.

FIG. 3 illustrates alternative operations 300 for managing dual readers based on certification parameters of a dual reader storage system. An operation 302 determines acceptable BER using a single reader. In one implementation, the acceptable BER using a single reader may be the lower acceptable BER value, such as −1.65. An operation 304 determines a minimum BER when using dual readers. In one implementation, the minimum BER using dual readers may be the upper acceptable BER value, such as −1.55. In one implementation, the acceptable BER using a single reader and the minimum BER using dual readers may be the same.

An operation 306 determines relative BER of each of the dual readers to select a preferable reader as the one having a lower BER. For example, the relative BERs of each of the readers may be determined during the certification stage of an HDD. An operation 308 determines the actual current BER of the storage device for the last read operation or read operations for a preceding predetermined time-period. Furthermore, the operation 308 also determines the type of the corresponding read operation being either a single reader read operation or a dual-reader read operation.

Subsequently, an operation 314 compares the current actual BER of a read operation to the thresholds—the acceptable BER using a single reader and the minimum BER using dual readers. If the current actual BER of a read operation is below the lower acceptable BER and the current read operation is conducted using dual readers, next read operation is conducted using a single reader at 316. Specifically, the next read operation 316 may be performed using the preferable of the dual reader as determined during the certification of the dual reader storage device. If the current actual BER of a read operation is above the upper acceptable BER and the current read operation is conducted using a single reader, next read operation is conducted using dual readers at 318.

Figure 4:
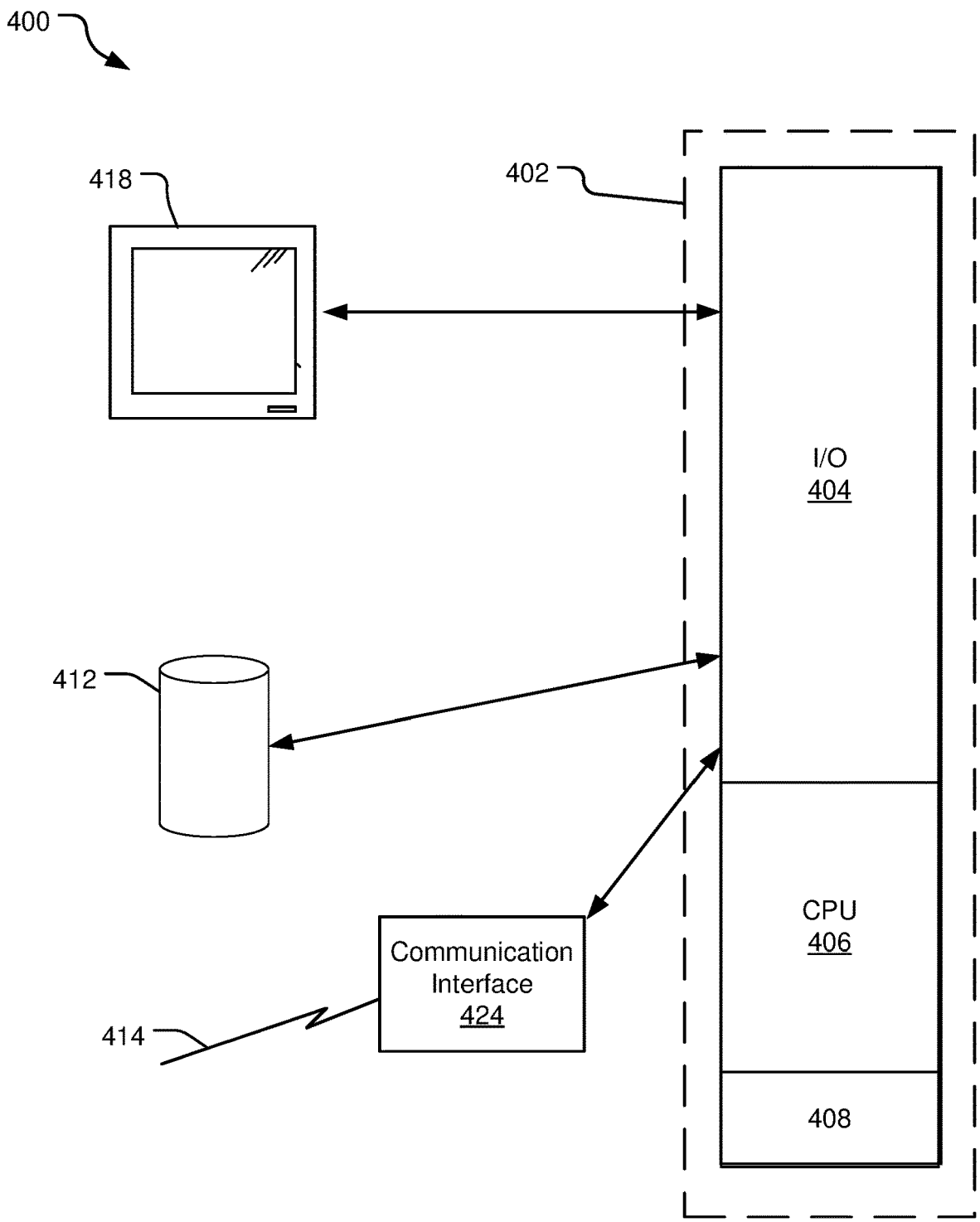
FIG. 4 illustrates an example processing system that may be useful in implementing the described technology.

FIG. 4 illustrates an example processing system 400 that may be useful in implementing the described technology. The processing system 400 is capable of executing a computer program product embodied in a tangible computer-readable storage medium to execute a computer process. Data and program files may be input to the processing system 400, which reads the files and executes the programs therein using one or more processors (CPUs or GPUs). Some of the elements of a processing system 400 are shown in FIG. 4 wherein a processor 402 is shown having an input/output (I/O) section 404, a Central Processing Unit (CPU) 406, and a memory section 408. There may be one or more processors 402, such that the processor 402 of the processing system 400 comprises a single central-processing unit 406, or a plurality of processing units. The processors may be single core or multi-core processors. The processing system 400 may be a conventional computer, a distributed computer, or any other type of computer. The described technology is optionally implemented in software loaded in memory 408, a storage unit 412, and/or communicated via a wired or wireless network link 414 on a carrier signal (e.g., Ethernet, 3G wireless, 8G wireless, LTE (Long Term Evolution)) thereby transforming the processing system 400 in FIG. 4 to a special purpose machine for implementing the described operations. The processing system 400 may be an application specific processing system configured for supporting a distributed ledger. In other words, the processing system 400 may be a ledger node.

The I/O section 404 may be connected to one or more user-interface devices (e.g., a keyboard, a touch-screen display unit 418, etc.) or a storage unit 412. Computer program products containing mechanisms to effectuate the systems and methods in accordance with the described technology may reside in the memory section 408 or on the storage unit 412 of such a system 400.

A communication interface 424 is capable of connecting the processing system 400 to an enterprise network via the network link 414, through which the computer system can receive instructions and data embodied in a carrier wave. When used in a local area networking (LAN) environment, the processing system 400 is connected (by wired connection or wirelessly) to a local network through the communication interface 424, which is one type of communications device. When used in a wide-area-networking (WAN) environment, the processing system 400 typically includes a modem, a network adapter, or any other type of communications device for establishing communications over the wide area network. In a networked environment, program modules depicted relative to the processing system 400 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 408 and/or the storage unit 412 and executed by the processor 402. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 408 and/or the storage unit 412 and executed by the processor 402.

The processing system 400 may be implemented in a device, such as a user device, storage device, IoT device, a desktop, laptop, computing device. The processing system 400 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method, comprising:
   determining an acceptable parameter rate for a dual reader storage device having dual readers;
   identifying one of the dual readers as the preferable reader;
   comparing an actual parameter rate of the storage device to the acceptable parameter rate of the storage device; and
   in response to determining that the actual parameter rate is below the acceptable parameter rate, operating the storage device using only the preferable reader.

2. The method of claim 1, wherein the parameter rate is bit-error rate (BER) of the dual readers.

3. The method of claim 2, further comprising:
   operating the storage device using the preferable reader as long as the actual BER is below the acceptable BER;
   comparing the actual BER of the storage device to a minimum BER; and
   in response to determining that the actual BER is at or above the minimum BER, operating the storage device using both of the dual readers.

4. The method of claim 3, wherein identifying one of the dual readers as the preferable reader further comprising comparing the BER of the dual readers during a certification stage of the dual reader storage device.

5. The method of claim 3, wherein identifying one of the dual readers as the preferable reader further comprising determining the actual BER after user data is fully recovered during a sector read of the dual reader storage device.

6. The method of claim 3, wherein the acceptable BER of the dual reader storage device is 1.55.

7. The method of claim 3, wherein the minimum BER of the dual reader storage device is 1.65.

8. The method of claim 3, wherein determining the acceptable BER for a dual reader storage device further comprises determining the acceptable BER using the preferable reader.

9. In a computing environment, a method performed at least in part on at least one processor, the method comprising:
   determining an acceptable parameter rate for a dual reader storage device having dual readers;
   identifying one of the dual readers as the preferable reader;
   comparing an actual parameter rate of the storage device to the acceptable parameter rate of the storage device; and
   in response to determining that the actual parameter rate is below the acceptable parameter rate, operating the storage device using only the preferable reader.

10. The method of claim 9, wherein the parameter rate is bit-error rate (BER) of the dual readers.

11. The method of claim 10, further comprising:
    operating the storage device using the preferable reader as long as the actual BER is below the acceptable BER;
    comparing the actual BER of the storage device to a minimum BER; and
    in response to determining that the actual BER is at or above the minimum BER, operating the storage device using both of the dual readers.

12. The method of claim 10, wherein identifying one of the dual readers as the preferable reader further comprising comparing the BER of the dual readers during a certification stage of the dual reader storage device.

13. The method of claim 9, wherein identifying one of the dual readers as the preferable reader further comprising determining the actual BER after user data is fully recovered during a sector read of the dual reader storage device.

14. The method of claim 10, wherein the acceptable BER of the dual reader storage device is 1.55 and wherein the minimum BER of the dual reader storage device is 1.65.

15. The method of claim 10, determining the acceptable BER for a dual reader storage device further comprises determining the acceptable BER using the preferable reader.

16. One or more tangible computer-readable storage media encoding computer-executable instructions for executing on a computer system a computer process, the computer process comprising:
    determining an acceptable parameter rate for a dual reader storage device having dual readers;
    identifying one of the dual readers as the preferable reader;
    comparing an actual parameter rate of the storage device to the acceptable parameter rate of the storage device; and
    in response to determining that the actual parameter rate is below the acceptable parameter rate, operating the storage device using only the preferable reader.

17. One or more tangible computer-readable storage media of claim 16, wherein the parameter rate is bit-error rate (BER) of the dual readers.

18. One or more tangible computer-readable storage media of claim 17, further comprising:
    operating the storage device using the preferable reader as long as the actual BER is below the acceptable BER;
    comparing the actual BER of the storage device to a minimum BER; and
    in response to determining that the actual BER is at or above the minimum BER, operating the storage device using both of the dual readers.

19. One or more tangible computer-readable storage media of claim 17, wherein identifying one of the dual readers as the preferable reader further comprising comparing the BER of the dual readers during a certification stage of the dual reader storage device.

20. One or more tangible computer-readable storage media of claim 17, wherein the acceptable BER of the dual reader storage device is 1.55 and wherein the minimum BER of the dual reader storage device is 1.65.

* * * * *